(12) United States Patent
Venkatramani et al.

(10) Patent No.: US 10,812,497 B2
(45) Date of Patent: Oct. 20, 2020

(54) SYSTEMS AND METHODS FOR DETECTING AND RESPONDING TO SECURITY THREATS USING APPLICATION EXECUTION AND CONNECTION LINEAGE TRACING

(71) Applicant: Prismo Systems Inc., Santa Clara, CA (US)

(72) Inventors: Anjan Venkatramani, Los Altos, CA (US); Chihwei Chao, Saratoga, CA (US)

(73) Assignee: Prismo Systems Inc., Santa Clara, CA (US)

( * ) Notice: Subject to any disclaimer, the term of this patent is extended or adjusted under 35 U.S.C. 154(b) by 388 days.

(21) Appl. No.: 15/372,304

(22) Filed: Dec. 7, 2016

(65) Prior Publication Data

US 2017/0163666 A1    Jun. 8, 2017

Related U.S. Application Data

(60) Provisional application No. 62/264,192, filed on Dec. 7, 2015.

(51) Int. Cl.
*H04L 29/06* (2006.01)

(52) U.S. Cl.
CPC ...... *H04L 63/1416* (2013.01); *H04L 63/0272* (2013.01); *H04L 63/1425* (2013.01); *H04L 63/20* (2013.01)

(58) Field of Classification Search
CPC ............. H04L 63/1416; H04L 63/0272; H04L 63/1425; H04L 63/20

(Continued)

(56) References Cited

U.S. PATENT DOCUMENTS 7,032,114 B1 *   4/2006   Moran ................... G06F 21/554
                                                                713/176
8,239,531 B1 *   8/2012   Bellovin ............. H04L 63/0272
                                                                709/203

(Continued)

FOREIGN PATENT DOCUMENTS

EP        3387517 A1    10/2018
WO    2017100364 A1     6/2017

OTHER PUBLICATIONS

"Call Graphs", 3.9.x Documentation, AppDynamics Documentation, AppDynamics, Inc., Oct. 4, 2014, Retrieved from https://web.archive.org/web/20141004022708/https://docs.appdynamics.com/display/PRO39/Call+Graphs on Jul. 7, 2017, 10 pages.

(Continued)

*Primary Examiner* — Eleni A Shiferaw
*Assistant Examiner* — Sakinah White Taylor
(74) *Attorney, Agent, or Firm* — KPPB LLP

(57) ABSTRACT

Systems and methods for detecting security threats using application execution and connection lineage tracing with embodiments of the invention are disclosed. In one embodiment, detecting suspicious activity in a network includes receiving at a collector server a first activity data including a first set of attributes, combining a first set of context information with the first activity data to generate a first activity record, comparing the first activity record to a set of baseline signatures, incrementing a count of a first matching baseline signature when the first activity record has the same values for all attributes, receiving a second activity data including a third set of attributes, combining a second set of context information with the second activity data to generate a second activity record, and generating an alert when the attributes of the second activity record differ from all baseline signatures.

38 Claims, 8 Drawing Sheets

(58) Field of Classification Search
USPC .......................................................... 726/23
See application file for complete search history.

(56) References Cited

U.S. PATENT DOCUMENTS

| | | | |
|---|---|---|---|
| 8,418,249 | B1 | 4/2013 | Nucci et al. |
| 2004/0025042 | A1 | 2/2004 | Kouznetsov et al. |
| 2007/0006314 | A1 | 1/2007 | Costa et al. |
| 2007/0074169 | A1 | 3/2007 | Chess et al. |
| 2010/0251371 | A1 | 9/2010 | Brown |
| 2010/0332473 | A1* | 12/2010 | Brodsky .................. G06F 8/75 707/736 |
| 2013/0080631 | A1 | 3/2013 | Lin |
| 2013/0117848 | A1 | 5/2013 | Golshan et al. |
| 2015/0052595 | A1* | 2/2015 | Murphy .................. G06F 21/44 726/7 |
| 2016/0055166 | A1* | 2/2016 | Guilford ........... G06F 17/30238 707/752 |
| 2016/0127412 | A1 | 5/2016 | Beskrovny et al. |
| 2016/0323301 | A1 | 11/2016 | Boss et al. |
| 2017/0318076 | A1 | 11/2017 | Bansal et al. |

OTHER PUBLICATIONS

"Transaction Snapshots", 3.9.x Documentation, AppDynamics Documentation, AppDynamics, Inc., Sep. 28, 2014, Retrieved from https://web.archive.org/web/20140928192504/https://docs.appdynamics.com/display/PRO39/Transaction+Snapshots on Jul. 7, 2017, 18 pages.
Wurzinger, Peter et al.,"Automatically Generating Models for Botnet Detection", iSecLab, Technical Reports, TR-iSecLab-0609-001, Sep. 21-23, 2009, 17 pages.
Extended European Search Report for European Application No. 16873795.5, Search completed Apr. 3, 2019, dated Apr. 17, 2019, 9 Pgs.
International Preliminary Report on Patentability for International Application PCT/US2016/065450, Report issued Jun. 12, 2018, dated Jun. 21, 2018, 11 Pgs.
International Search Report and Written Opinion for International Application No. PCT/US2016/065450, Search completed Jan. 30, 2017, dated Feb. 21, 2017, 13 Pgs.
"Alert (TA15-314A): Compromised Web Servers and Web Shells—Threat Awareness and Guidance", US Department of Homeland Security, CISA Cyber + Infrastructure, Nov. 10, 2015, Last Revised: Aug. 9, 2017, retrieved from https://www.us-cert.gov/ncas/alerts/TA15-314A on Apr. 21, 2020, 5 pgs.
"CWE-643: Improper Neutralization of Data within XPath Expressions ('XPath Injection')", Common Weakness Enumeration, 2008, Page Last Updated: Feb. 20, 2020, retrieved from https://cwe.mitre.org/data/definitions/643.html on Apr. 21, 2020, 3 pgs.
"ECMAScript parsing infrastructure for multipurpose analysis", Esprima, Dec. 24, 2017, retrieved from https://web.archive.org/web/20171224121534/https://esprima.readthedocs.io/en/ latest/syntactic-analysis.html on May 8, 2020, 10 pgs.
"Exploit Public—Facing Application", MITRE, Apr. 18, 2018, Last Modified: Oct. 22, 2019, retrieved from https://attack.mitre.org/techniques/T1190/ on Apr. 21, 2020, 2 pgs.

"Google Forms <= 0.91—Unauthenticated Server-Side Request Forgery (SSRF)", Jan. 20, 2018, Last Updated Nov. 1, 2019, retrieved from https://wpvulndb.com/vulnerabilities/9013 on Apr. 21, 2020, 3 pgs.
"JSON-ASTy", GitHub, 2019, retrieved from https://github.com/rse/json-asty on Apr. 21, 2020, 3 pgs.
"LDAP Filter Parser", Mar. 19, 2018, retrieved from https://web.archive.org/web/20180319143303/https://www.rubydoc.info/github/ruby-ldap/ruby-net-ldap/Net/LDAP/Filter/FilterParser on May 8, 2020, 2 pgs.
"libpg_query", GitHub, Oct. 24, 2019, retrieved from https://github.com/lfittl/libpg_query/blob/10-latest/README.md#resources on Apr. 21, 2020, 5 pgs.
"NoSQL Injection in MongoDB", Zanon, Jul. 17, 2016, retrieved from https://zanon.io/posts/nosql-injection-in-mongodb on Apr. 21, 2020 5 pgs.
"otto", GitHub, 2019, retrieved from https://github.com/robertkrimen/otto on Apr. 21, 2020, 17 pgs.
"PHP-Shell-Detector", GitHub, Oct. 5, 2015, retrieved from https://github.com/emposha/PHP-Shell-Detector/blob/master/README.md on Apr. 21, 2020, 4 pgs.
"sqlmap", MITRE, Apr. 18, 2018, Last Modified: Oct. 17, 2018, retrieved from https://attack.mitre.org/software/S0225/ on Apr. 21, 2020, 11 pgs.
"W3 Total Cache SSRF vulnerability", Klikki, Oct. 31, 2016, retrieved from https://klikki.fi/adv/w3_total_cache.html on Apr. 21, 2020, 2 pgs.
"Web Shell", MITRE, May 31, 2017, Las Modified: Jul. 17, 2019, retrieved from https://attack.mitre.org/wiki/Technique/T1100 on Apr. 21, 2020, 3 pgs.
"WordPress Plugin Brandfolder 3.0—Local/Remote File Inclusion", Exploit Database, Mar. 22, 2016, retrieved from https://www.exploit-db.com/exploits/39591 on Apr. 21, 2020, 2 pgs.
"XXE that can Bypass WAF Protection", Wallarm, Jan. 30, 2019, retrieved from https://lab.wallarm.com/xxe-that-can-bypass-waf-protection-98f679452ce0/ on Apr. 21, 2020, 13 pgs.
Alonso et al., "LDAP Injection & Blind LDAP Injection", 2008, retrieved from https://www.blackhat.com/presentations/bh-europe-08/Alonso-Parada/Whitepaper/bh-eu-08-alonso-parada-WP.pdf on Apr. 21, 2020, 18 pgs.
Karande, "A1—2 SQL and NoSQL Injection", OWASP NodeGoat Tutorial, 2016, retrieved from https://ckarande.gitbooks.io/owasp-nodegoat-tutorial/content/tutorial/a1_-_sql_and_nosql_injection.html on Apr. 21, 2020, 1 pg.
Singh et al., "Evasions in Intrusion Prevention/Detection Systems", Virus Bulletin, Apr. 1, 2010, retrieved from https://www.virusbulletin.com/virusbulletin/2010/04/evasions-intrusion-prevention-detection-systems on Apr. 21, 2020, 15 pgs.
Invitation to Pay Additional Fees and Partial Search Report Received for International Application PCT/US2020/027535, dated Jun. 3, 2020, 2 Pages.
International Search Report and Written Opinion for International Application No. PCT/US2020/027535, Search Completed Jul. 23, 2020, dated Aug. 12, 2020, 10 Pgs.
Stasinopoulos et al., "Commix: Detecting and exploiting command injection flaws", Department of Digital Systems, University of Piraeus, 2015, retrieved on Jul. 23, 2020, retrieved from the internet, 10 pgs.

* cited by examiner

SYSTEMS AND METHODS FOR DETECTING AND RESPONDING TO SECURITY THREATS USING APPLICATION EXECUTION AND CONNECTION LINEAGE TRACING

CROSS-REFERENCE TO RELATED APPLICATIONS

The present application claims priority under 35 U.S.C. 119(e) to U.S. Provisional Patent Application No. 62/264,192 entitled "Systems and Methods for Detecting Network Security Threats Using Application Data Flow and Connection Lineage Tracing," to Venkatramani et al., filed Dec. 7, 2015, the disclosure of which is incorporated by reference herein in its entirety.

FIELD OF THE INVENTION

The present invention relates generally to security in enterprise, cloud, and internet of things (IoT) environments and more specifically to collecting connection and application execution information while tracking the users and machines involved.

SUMMARY OF THE INVENTION

Systems and methods for detecting and responding to security threats using application execution and connection lineage tracing in accordance with embodiments of the invention are disclosed. In one embodiment, a process for detecting suspicious activity in a network and in a computer server system includes receiving at a collector server, from a first connection and application execution sensor, a first piece of activity data including a first set of attributes, each attribute having a particular value, combining, using the collector server, a first set of context information with the first piece of activity data to generate a first activity record, comparing, using the collector server, the first activity record to a set of baseline signatures, where each baseline signature includes a second set of attributes, each attribute having a particular value and each baseline signature being unique in the combination of values of its attributes, incrementing, using the collector server, a count of a first matching baseline signature from the set of baseline signatures when the first activity record has the same values for all attributes in the first matching baseline signature, receiving at a collector server, from a second connection and application execution sensor, a second piece of activity data including a third set of attributes, each attribute having a particular value, combining, using the collector server, a second set of context information with the second piece of activity data to generate a second activity record, and generating, using the collector server, an alert when the values of the attributes of the second activity record differ from all baseline signatures in the set of baseline signatures by at least a predetermined threshold number of attributes.

A further embodiment also includes storing the first activity record in a connection and application execution database as a record that includes a reference to the first matching baseline signature, and values of attributes other than common attributes present in both the first activity record and the first matching baseline signature.

In another embodiment, associating, using the collector server, a first set of context information with the first piece of activity data includes looking up an IP address within the first piece activity data with an identity manager service to identify an associated entity.

In a still further embodiment, the first piece of activity data includes connection information concerning communication on a device.

In still another embodiment, the connection information includes the attributes of: user name initiating the communication, identification of the user device, responding application name, responding server name, login ID to responding server, tunnel endpoint IP, and VPN gateway server.

In a yet further embodiment, the connection information is a session chain representing the activity of a particular user identity across different servers.

In yet another embodiment, the first piece of activity data includes application execution information concerning an executing application on a device.

In a further embodiment again, the application execution information includes the attributes of: server name, application name, executable image path name, interpreter script name, system user ID, command line, current working directory, and process start time.

In another embodiment again, the application execution information also includes the attributes of: session signature ID, session signature chain ID, and parent application.

In a further additional embodiment, the application execution information includes the attributes of: server name, file path name, system user ID, application name, and file access mode.

In another additional embodiment, the application execution information also includes the attributes of: session signature ID and session signature chain ID.

In a still yet further embodiment, the application execution information includes a stack trace of an executing application.

In still yet another embodiment, the first connection and application execution sensor is dynamically configurable.

A still further embodiment again also includes highlighting within a user interface for review a reduced set of baseline signatures having a count below a predetermined threshold.

Still another embodiment again also includes highlighting within a user interface for review a reduced set of baseline signatures unique to an entity within a group of entities to which the entity belongs.

A still further additional embodiment, also includes highlighting within a user interface for review a reduced set of baseline signatures based upon a security policy.

Still another additional embodiment, also includes monitoring user logins, privileges used by logged in users, process and file creations, and process and file executions on the first connection and application execution sensor to detect a compromise of the sensor.

In a yet further embodiment again, the first connection and application execution sensor is implemented using a hardware co-processor on a device.

Yet another embodiment again also includes searching for and retrieving the first activity record in response to a user instruction.

In a yet further additional embodiment, the alert includes one or more closest matching baseline signatures to the second activity record.

In yet another additional embodiment, a collector server for detecting suspicious activity in a network and a computer server system, includes a processor, a network interface, and memory including a collector application, where the processor is directed by the collector application to receive, from a first connection and application execution sensor, a first piece of activity data including a first set of attributes, each attribute having a particular value, combine a first set of context information with the first piece of activity data to generate a first activity record, compare the first activity record to a set of baseline signatures, where each baseline signature includes a second set of attributes, each attribute having a particular value and each baseline signature being unique in the combination of values of its attributes, increment a count of a first matching baseline signature from the set of baseline signatures when the first activity record has the same values for all attributes in the first matching baseline signature, receive at a collector server, from a second connection and application execution sensor, a second piece of activity data including a third set of attributes, each attribute having a particular value, combine a second set of context information with the second piece of activity data to generate a second activity record, and generate an alert when the values of the attributes of the second activity record differ from all baseline signatures in the set of baseline signatures by at least a predetermined threshold number of attributes.

In a further additional embodiment again, the memory also includes an identity management application and the identity management application directs the processor to receive the first set of context information and second set of context information.

In another additional embodiment again, the memory also includes an enforcement application and the enforcement application directs the processor to dynamically configure the first connection and application execution sensor in response to the generated alert.

In a still yet further embodiment again, the collector application also directs the processor to store the first activity record in a connection and application execution database as a record that includes a reference to the first matching baseline signature, and values of attributes other than common attributes present in both the first activity record and the first matching baseline signature.

DETAILED DESCRIPTION

Figure 1A:
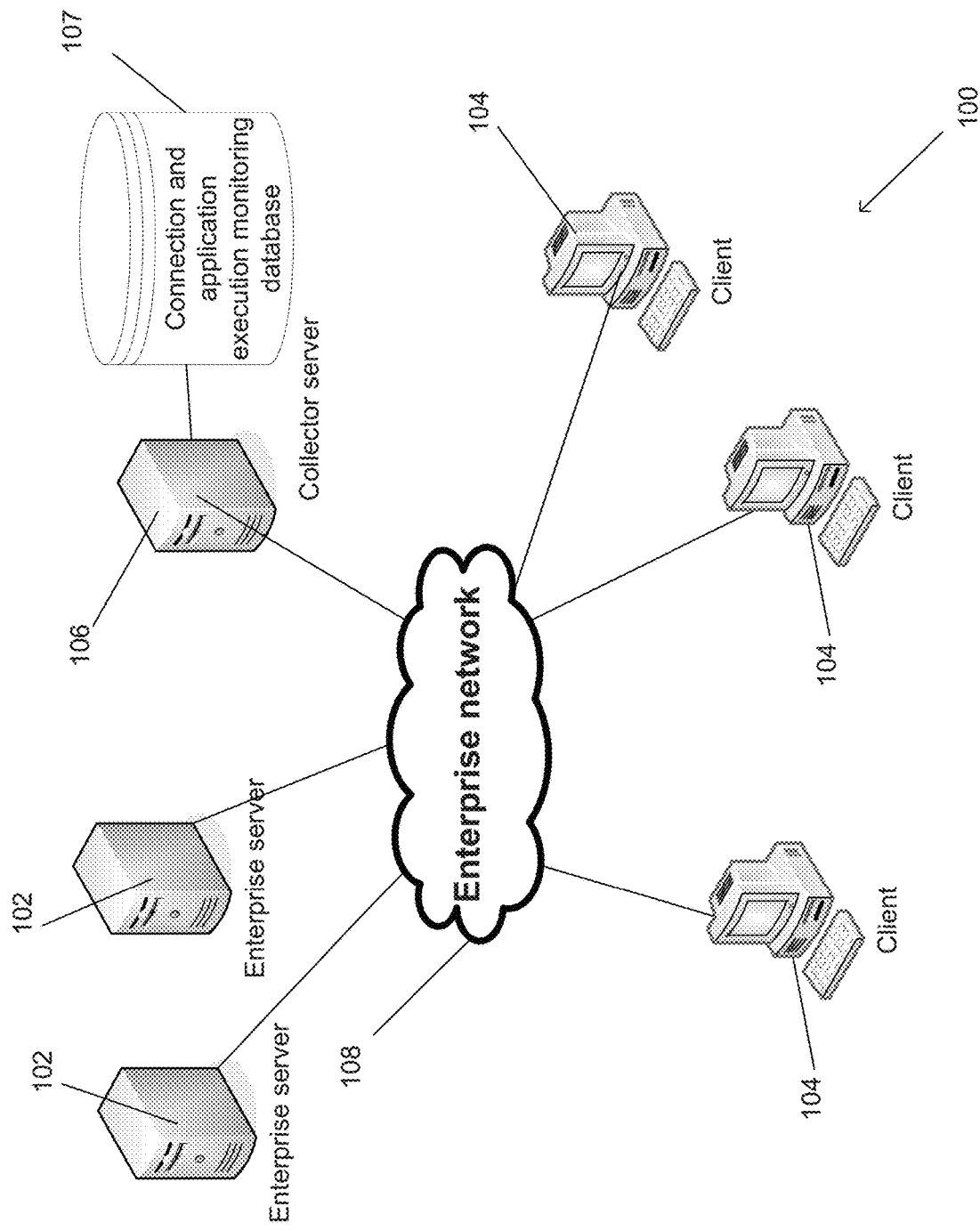
FIG. 1A is a system overview illustrating enterprise servers, user devices, and a collector server in accordance with embodiments of the invention.

Turning now to the drawings, systems and methods for detecting security threats using application execution and connection lineage tracing are illustrated. In enterprise computer systems, threats are often introduced into the environment (including, but not limited to, users, machines, applications, and/or network elements) and propagate to discover and exfiltrate or lock sensitive information from assets in the enterprise in a way that attempts to avoid detection. In this type of scenario, the enterprise perimeter has possibly been breached (in any one of many ways) and the security threat is now inside the enterprise environment. The initial landing point for the security threat is unlikely to be any of the critical enterprise assets and even after the security threat has reached or has access to a critical asset, it will have to engage in a series of steps to exfiltrate or lock the data. The security threat typically must communicate, propagate gained elevated privileges, and execute from its landing point before it can exfiltrate data. The time from reconnaissance and infiltration to data exfiltration is often greater than 200 days. Threat detection and response systems in accordance with many embodiments of the invention aim to detect this vertical and horizontal propagation of the threat within an enterprise environment, including any data centers and extensions of data storage into cloud services. Accordingly, threat detection and response systems in accordance with a number of embodiments of the invention utilize a series of cascading, coarse to fine filters through which different sets of information are passed, which can include threat information and/or threat models. As will be described in greater detail below, threat detection and response systems in accordance with various embodiments of the invention implement Application Execution and Connection Lineage Tracing (AE-CLT) filtering as one of the initial filters in such a system.

AE-CLT filtering tracks user-to-machine, machine-to-machine, and/or user-to-user communications within the enterprise. User-to-machine communications can refer to interactions that a user directs through a client device (e.g., mobile phone, tablet, computer, etc.), such as (but are not limited to) web site or application access, and login to remote machine through SSH (Secure Shell). Machine-to-machine communications can refer to interactions directed by an application or other programming on a machine (typically a server) to interact with another machine, such as (but are not limited to) web server to application, application to database, and other backend operations. User-to-user communications can refer to interactions directed by a user to interact with another user each using client devices, such as (but are not limited to) email, instant messaging, text messaging, videoconferencing. In many instances, user-to-user communications still pass through servers. User-to-Internet communications may be incidentally monitored when they utilize enterprise network resources.

In large enterprises, employees (users) and machines may number upwards of 100,000 or more and AE-CLT filtering can scale to these large numbers due to the absence of any deep packet inspection requirements for performing AE-CLT filtering.

AE-CLT filtering can use information collected on connections and executing applications to generate baseline signatures that are used to match attributes of subsequent connections and application execution trees to determine if they are likely normal operation or an anomalous condition. In addition to receiving network connection information, AE-CLT filtering can also involve performing application execution monitoring to trace the code that executed and/or conduct platform monitoring for installations, configuration, dynamic loading, and processes that are executing, process spawning, call graphs, and/or file access.

The collected information (including connection and/or application execution information) can be referred to as activity data, where each piece of activity data includes values for each of a predefined set of attributes (metadata) that describes a particular connection or aspect of application execution. In additional embodiments, all activity data is stored in a database for to enable auditing, compliance, and/or forensics. Activity data can be stored in an efficient way by using a pointer, identifier, or reference to a baseline signature that includes a set of predefined attribute values (that is a subset of all attributes captured) and then storing only the attribute values not included in the baseline signature. In many embodiments, activity data is combined with context information (such as identity) for storage in a connection and application execution monitoring database and can then be referred to as an activity record.

The threat detection and response system can respond to detected threats by performing enforcement against connections and/or application execution events involving specific IP addresses, machines, applications, processes, files, and/or users. In a number of embodiments, enforcement is determined based upon system administrator defined policies and enforcement can involve automated quarantining, referral to a security analyst, and/or reconfiguring connections within the network to route suspicious traffic through additional filters for heightened scrutiny using deeper levels of data inspection and/or heightened inspection latency.

Threat detection and response systems that perform AE-CLT filtering and the use of AE-CLT filtering for connectivity and application execution monitoring and security threat detection in accordance with various embodiments of the invention is discussed further below.

System Architecture

Components of a system for application execution signature and connection lineage tracing in accordance with embodiments of the invention can include software applications and/or modules that configure a server or other computing device to perform processes as will be discussed further below. A system including enterprise servers 102 and client devices 104 to be monitored and a collector server 106 in accordance with embodiments of the invention is illustrated in FIG. 1A. Each enterprise server 102 may have a network connectivity and application execution sensor installed to collect network and/or application information and forward it to the collector server 106. In some embodiments, an enterprise or other environment that includes large numbers of servers is monitored by multiple collector servers where each collector server forms a cluster with sensors associated with it. For a monitored session where both ends are monitored servers with associated sensors, but are associated with different collectors, the two collectors exchange sensor information they received respectively so that they both have complete system activity information at both ends. In several embodiments, the network connectivity and application execution sensor is implemented within the server to enable monitoring of the server kernel as the server system executes application software. The term kernel is typically understood to refer to a portion of a server system's operating system software that manages I/O requests from other software applications, and translates them into data processing instructions for the server system processors. The instructions of the kernel are typically contained within a protected area of memory and, in many embodiments, the instructions of the network connectivity and application execution monitor application are also contained within protected memory. In additional embodiments, a network connectivity and application execution sensor is implemented using a separate security co-processor within the server. The security co-processor can provide an on-chip firewall that performs connection lookups for all or a portion of incoming packets, to determine whether the packet belongs to an existing connection or starts a new connection. Processing of packets of a new connection can be handled by the software of the security co-processor by looking up a firewall policy configuration with respect to the requested connection. The policy can consider information that is typically associated with a network connection and additional information available from the server including (but not limited to) the process, application name, user identity associated with the process, and various conditions imposed on the running process and software. Connectivity and application execution sensors implemented using security co-processors can also perform statistics gathering and code execution monitoring in a similar manner to connectivity and application execution sensors implemented directly within software on a server system. In addition, connectivity and application execution sensors in embodiments are implemented on virtual machines/containers or on physical machines. In a number of embodiments, connectivity and application execution sensors are also present as separate appliances within the network. Traffic to a specific server can be mirrored to a connectivity and application execution sensor for analysis. In this way, connectivity monitoring can be performed in circumstances where application servers do not support connectivity and application execution sensor applications. When connectivity and application execution sensors are utilized within a network, communications with client devices 104 may be monitored from the viewpoint of an enterprise server and also from the viewpoint of the client device if it has a network connectivity and application execution sensor application installed. Connectivity and application execution sensors may be installed on any of a variety of devices in accordance with embodiments of the invention, such as internet of things (IoT) controlled systems and devices.

As mentioned further above, the connection and/or application execution information can be collected in the form of activity data that describe aspects or attributes of a communication to or from the observed system (in the case of a connection) or applications executing on the observed system (in the case of applications). Any specific sensor in accordance with embodiments of the invention is configured to capture activity data that describes a connection, executing applications, or both. Further embodiments of the invention include a "sensorless mode" in which an AE-CLT system does not utilize sensors, but utilizes network equipment to collect activity data.

In several embodiments, data received and processed by a collector server 106 is entered into a connection and application execution monitoring database 107. In various embodiments, the connection and application execution monitoring database 107 can be on the collector server 106, in direct communication with collector server 106, or in communication over a network with collector server 106. The connection and application execution monitoring database 107 can then be utilized to build a connectivity map describing the connections and/or the connection history of the system being monitored for security threats and/or an application execution map describing code and processes that were executing on the system and files that were accessed. The data entered may be in different formats and/or have different ranges of values. In many embodiments, the collector server 106 reformats and/or structures data prior to storing the data within the connection monitoring and application execution monitoring database 107. As can readily be appreciated the volume of data contained within the connection and application execution monitoring database can be sufficiently large that the connection and application execution monitoring database is implemented as a distributed database.

Figure 1B:
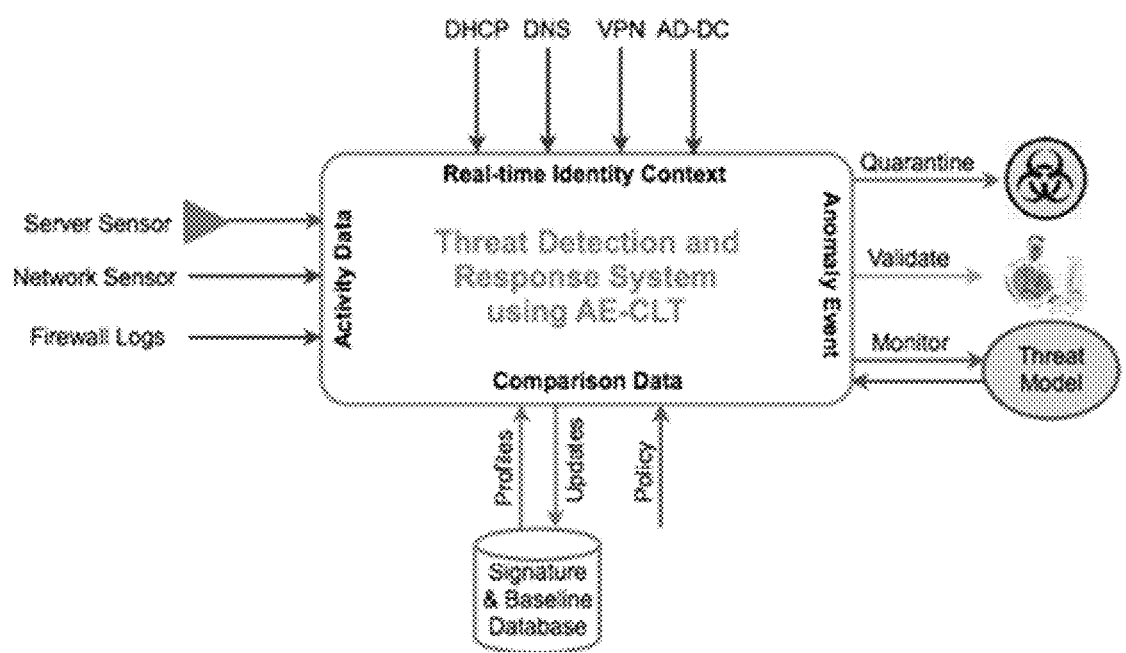
FIG. 1B conceptually illustrates operation of a threat detection and response system that performs application execution signature and connection lineage tracing filtering in accordance with embodiments of the invention.

The overall operation of a collector server system within a threat detection and response system in performing connectivity monitoring and the various sources of data and enforcement actions that can be taken by a collector server in accordance with various embodiments of the invention is illustrated in FIG. 1B. A collector application executing on a collector server system may receive connectivity information from connectivity and application execution sensors and information from additional sources including (but not limited to) firewall logs, and/or network and DNS logs. Identity context information can be received from sensors on network management servers hosting protocols such as Dynamic Host Configuration Protocol (DHCP), Domain Name System (DNS), Active Directory Domain Controller (AD-DC) and/or Virtual Private Network (VPN) information (log and/or protocols). Comparison data can be received from user-defined policies and a signature and baseline database built through unsupervised learning. Using the collected information, the collector server system within the threat detection and response system can identify potential threats. A system administrator can define policies that are specific to a particular enterprise that define the manner in which the threat detection and response system should respond to potential threats. Various enforcement actions can be directed by the collector server system in response to the policies including (but not limited to) immediately quarantining a machine, process, application, and/or user associated with a detected security threat, providing data for an analyst to validate, and/or monitoring the information using a threat model. In addition, the threat detection and response system can cause traffic to be routed through additional filters for deeper inspection to provide additional data relevant to various threat models and/or policies maintained by the system. In several embodiments, the enforcement actions are communicated to connectivity and application execution sensors that are reconfigured with policies that may block certain connections and/or route traffic associated with particular connections to filters for deeper inspection. As can readily be appreciated, the specific enforcement actions taken by the threat detection and response system and/or connectivity and application execution sensors when performing AE-CLT filtering largely depends upon the requirements of specific applications. In several embodiments, collected information is maintained for audit and compliance capabilities.

Although a specific system architecture for processing network connection information is described above with reference to FIGS. 1A and 1B, one skilled in the art will recognize that any of a variety of architectures may be utilized in accordance with embodiments of the invention.

As will be described further below, the collector server can normalize connection and/or application execution information with identity information to more specifically identify the user, application, geographic location of the user, and/or device involved in the communication or other activity. The data concerning connection or application execution information can be forwarded to other filters and/or threat detection hardware or software.

Connectivity and Application Execution Sensor

In several embodiments, network connection and/or application execution monitoring information for AE-CLT filtering may be collected by a connectivity and application execution sensor application that is installed on and executes from a server in the enterprise network, a security co-processor located on the server, or a separate connection and application execution monitoring appliance on the network. In many embodiments of the invention, the connectivity and application execution sensor application may collect envelope information about network connections that are established to or from the server on which the application is executing or, in the case of a separate connection monitoring appliance, other servers or machines that the appliance is monitoring. In some embodiments, the connectivity and application execution sensor application need not perform deep packet inspection (DPI) and only extracts metadata about connections from header information or the like. In several embodiments of the invention, the connectivity and application execution sensor application obtains information about applications that are executing on the server that may or may not involve network communications. As mentioned further above, threat detection and prevention systems in accordance with many embodiments of the invention may utilize AE-CLT filtering as a coarse filter and feed the results to other filters progressively where DPI may be performed. In this way, an AE-CLT filter may be scalable to monitor a large number of entities. In addition, threat detection and response systems in accordance with various embodiments of the invention can initiate enforcement actions in response to detection of a security threat and may utilize the connectivity and application execution sensor application to enforce security measures on each server or the affected servers.

Figure 2A:
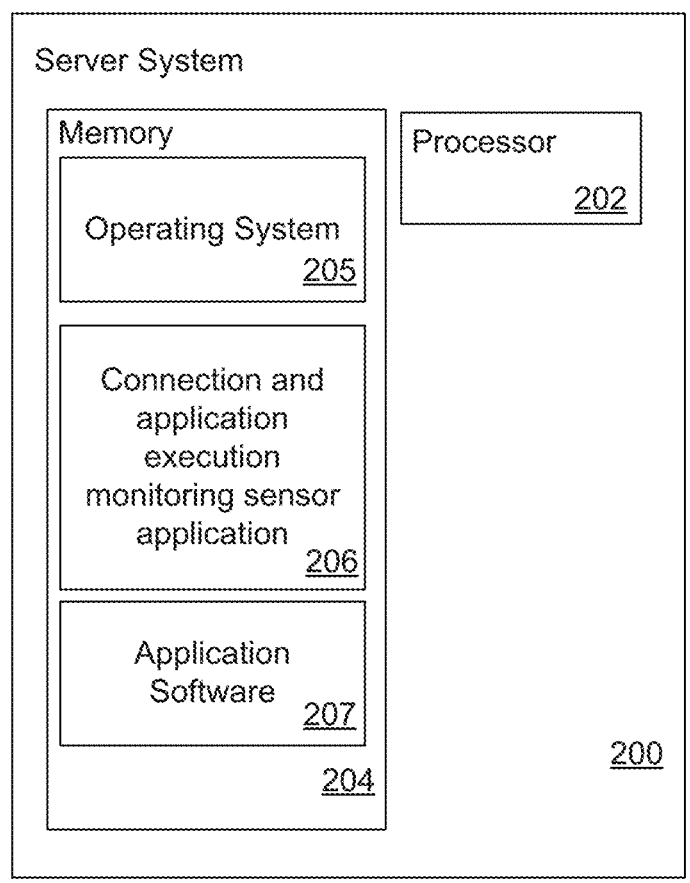
FIG. 2A conceptually illustrates a connectivity and application execution sensor configured to collect connection information in accordance with embodiments of the invention.

A server hosting a connectivity and application execution sensor application in accordance with embodiments of the invention is conceptually illustrated in FIG. 2A. The server 200 includes a processor 202 and non-volatile memory 204 that includes an operating system 205, a connectivity and application execution sensor application 206, and application software 207. The connectivity and application execution sensor application 206 may be executed to configure the processor 202 to perform processes for collecting connection information as will be discussed further below.

Figure 2B:
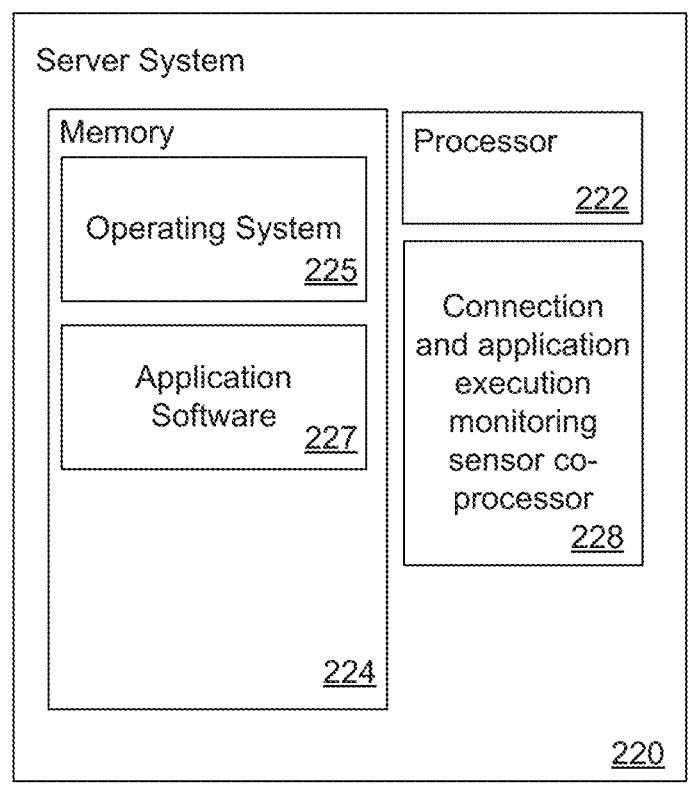
FIG. 2B conceptually illustrates a server having a connectivity and application execution sensor co-processor configured to collect information in accordance with embodiments of the invention.

A server hosting a connectivity and application execution sensor as a co-processor in accordance with embodiments of the invention is conceptually illustrated in FIG. 2B. The server 220 includes a processor 222 and non-volatile memory 224 that includes an operating system 225 and application software 227. The connectivity and application execution sensor co-processor 228 may perform processes for collecting connection information as will be discussed further below.

Various types of communications may be monitored. Connectivity monitoring can include the Data Plane (such as information transfer), Control Plane (such as authentication), and/or Discovery Plane (such as Domain Name System and Active Directory). It can include stateful (Transmission Control Protocol) and stateless (User Datagram Protocol) connections and connections at the data link layer (layer 2 in network models) and network layer (layer 3 in network models).

AE-CLT filtering in accordance with many embodiments of the invention can involve collecting envelope information from connections initiated in the network that can include, but is not limited to: sender and receiver identity, (e.g., Internet Protocol (IP) address, port, device, and/or machine identifier); number of bytes, packets, CPS, interpacket gap (IPG), etc.; duration and time of day. Additionally, application execution information can be collected, such as, but not limited to, the application, processes, libraries, and/or DLL (Dynamic Link Library), which may be derived from code execution and call stack monitoring. Application execution signatures, including process spawning, file access, and call graphs are discussed further below.

In many embodiments of the invention, a connectivity and application execution sensor implemented via hardware (e.g., a connectivity and application execution sensor security co-processor) or software (e.g., a connectivity and application execution sensor application) on a server captures envelope information of communications to and from the server. In several embodiments, a connectivity and application execution sensor generates one or more connection lineage signatures and can associate each signature with a connection to or from the server.

In several embodiments of the invention, a sensor is configured to perform remediation and/or enforcement actions per instructions from a collector. As will be discussed further below, a collector may generate an alarm based on received activity data not matching criteria of a set of baseline signatures. The collector may instruct one or more sensors (that can include the sensor that generated the activity data) to enforce a policy or other response. Enforcement actions can include, but are not limited to, dropping a specific connection, redirecting a connection to a fine filter for further inspection, or terminating a process or download.

In some embodiments, sensor features, such as enforcement, capture frequency (e.g., periodic sampling or continuous collection) and types of data captured, are dynamically controlled, such as by instructions from a collector.

Although specific architectures of servers for connection monitoring are discussed above with respect to FIGS. 2A and 2B, one skilled in the art will recognize that any of a variety of architectures may be utilized in accordance with embodiments of the invention.

Sensor Placement

In various embodiments of the invention, sensors are placed on the server or machine at one or both ends of a connection. To capture machine-to-machine communications, a sensor may be placed at each end of the connection. To capture user-to-machine communications, a sensor may be placed at the server end. In some embodiments, sensors are placed on user devices, which may be internet of things (IoT) controlled devices. In other embodiments, user devices do not include sensors because they may or may not be under a company's control or there may be privacy concerns. In various embodiments, sensors are placed in all machines (servers and client devices) within an enterprise network or in critical servers only.

In many embodiments, servers responsible for network management include sensors that collect identity context information that can be used to map users and/or devices to detected communications. As will be discussed further below, typically connection information includes sender and receiver IP addresses but not information identifying the device or user that is a party to the communication. This can be determined using identity context information.

Information on open ports and connections without port registration may be captured by a sensor. In addition, firewalls logs may be retrieved to derive terminated and refused connections.

Collector Server

Figure 3:
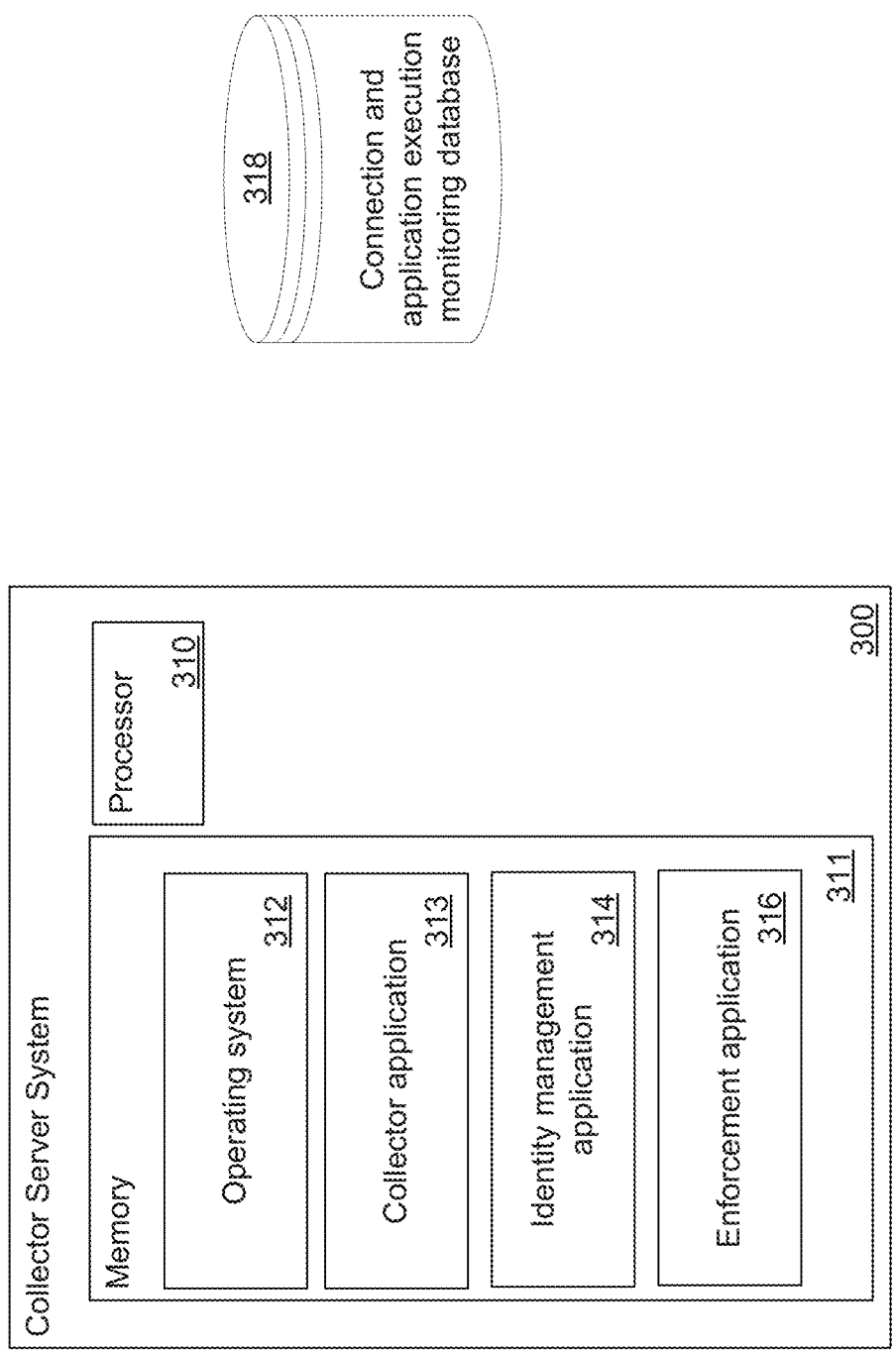
FIG. 3 conceptually illustrates a collector server configured to receive connection information and/or context information in accordance with embodiments of the invention.

In many embodiments of the invention, data collected by connectivity and application execution sensors are received and processed by a collector server then entered into a connection and application execution monitoring database. The data entered may be in different formats and/or have different ranges of values— this data may be reformatted and/or structured by a collector server. As will be described further below, connection information may also be normalized with identity information to more specifically identify the user, application, geographic location, and/or device involved in the communication. The data concerning connection information in the connection and application execution monitoring database can be forwarded to other filters and/or threat detection hardware or software. A collector server in accordance with embodiments of the invention is conceptually illustrated in FIG. 3. The collector server 300 includes a processor 310 and non-volatile memory 311 that includes an operating system 312, a collector application 313, an identity management application 314, and an enforcement application 316. The processor 310 may be configured by the applications 313, 314, and 316 to perform processes as will be discussed further below. The collector application 313 coordinates with and obtains information from sensors. The identity management application 314 collects identity information that can be associated with connection and application execution information. The enforcement application 316 includes an analytics engine for detecting anomalies, policy engine for managing and enforcing policies, and/or a controller to control dynamically controlled sensors such as by using a closed-feedback loop. In several embodiments, the server system 300 also includes a user interface.

In several embodiments, the connection and application execution monitoring database 318 are on the same server as the collector. In other embodiments, the collector and the database 318 are on separate servers. The collector server can communicate with a database management system that maintains a connection and application execution monitoring database directly or over a network. In further embodiments, the database 318 is a distributed database and/or the collector is a distributed system. Distributed systems can be in a hierarchical and/or scalable architecture.

Identity Manager

In several embodiments of the invention, a collector system utilizes an identity management application to resolve the identity of an entity involved (e.g., sender or receiver of communication or system having application activity) with a particular activity record. IP addresses in connectivity records could be dynamic and, further, are often not conducive for policy specification, visualization and anomaly detection. Often, records report IP addresses and port numbers of the two endpoints forming the TCP connections rather than user identity information. These activities are optimally captured using names of clients, groups, resources, applications and their associated privileges. In many embodiments of the invention, an identity manager application establishes and maintains the mapping of IP address to Client+Device and Application+Service. It uses Dynamic Host Configuration Protocol (DHCP), Domain Name System (DNS), Active Directory Domain Controller (AD-DC) and/or Virtual Private Network (VPN) information (log and/or protocols) to map on-premises and remote users and machines in the network.

Enterprise IP addresses associated with user devices are typically dynamically assigned, which means that the same IP address could be assigned to different devices owned by different employees at different points in time. To map an IP address to a particular device and employee at any given time, a history of leases may be established for each dynamic IP address. This information can be extracted from a DHCP server (log and/or protocols). However the DHCP information typically contains only the IP address, hostname, and MAC address of the device leasing the IP address, but does not include the user information or user account of the person using the device. User information is typically available through network devices that require logon credentials, such as a VPN gateway for remote access, Wireless Access Point, and/or a Domain Controller in a Windows Domain, etc. These authentication appliances contain user name, IP address or MAC Address, plus the timestamp of the logon. By correlating information from these different entities, user name and account information can be added to the DHCP IP allocation record for a complete map of IP address to User, Device, Application and/or User Location. Once identity is associated with specific activity records within a connection and application execution monitoring database, additional insights can be obtained with respect to anomalous behavior on the part of specific users, specific devices, and/or specific applications.

Connection lineage signature information is described in greater detail below.

Connection Lineage Tracing

Connection lineage tracing involves adding context information and/or linking activity information to connection information gathered by the collector server(s) from multiple sensors.

The context information could include, but is not limited to, identity information of the entities at either or both ends of the connection. Identity information can include, but is not limited to, the user or application name, the user's network name (enterprise logon information), the user's system name (dev, admin, root etc.), identity of the user device or machine application is hosted on, user location, and/or process information the connection terminates in or the library in the application that initiated or terminated the connection. These additional context information help to distinguish, as an example, the same shared system name (admin, root, dev etc.) being used by two different network users.

Activity information can include, but is not limited to, commands executed, processes spawned, and/or files accessed. Linking activity information to connection information enables distinguishing the same file being accessed or the same process being spawned by two different users.

In several embodiments, connection lineage tracing is performed end-to-end and the entities involved can be directly interacting (such as user to application on a machine) or interacting through multiple other intermediate entities in a chain (such as user to application on a machine to another application on a different machine).

Information that is collected in accordance with embodiments of the invention can be categorized by various layers or domains of collection as discussed below. Security applications are often improved by layering detection at different aspects and different contexts to analyze anomalous patterns. The domains discussed below include the session domain where collected information includes connectivity lineage signatures and the application domain where the collected information includes application execution signatures. A connectivity and application execution sensor in accordance with various embodiments of the invention may collect any or all of the types of information discussed below, such as only specific types of connectivity lineage signatures, specific types of application execution signatures, or both.

Session Signatures

End-end sessions include both user-application sessions and application-application sessions. A session signature is a collection of session attributes that uniquely characterize sessions having a common behavior, which includes information such as, but not limited to:

user name or initiating application name (source)
user device or initiating application server (source machine)
responding application name (receiver)
responding server name (receiver machine)
login ID to responding server (attribute N/A for an application)
tunnel endpoint IP (attribute N/A for application)
VPN gateway server (attribute N/A for application)
distribution over time (e.g., a configurable period or range such as time of day, days, weeks months, or repeat period such as day of the week)

As will be discussed further below, tunnel endpoint IP (Internet Protocol) address and/or VPN gateway server can be used to determine a geographic location.

In many embodiments of the invention, a database of session records is built as follows. Activity data in the form of connectivity records received from the sensor installed in a monitored server are combined with identity information to form session records, processed by the collector to extract its session signature attributes, and then compared to the existing set of session signatures the collector has gathered. If the session signature attributes of this new session record matches any existing signature, then the reference count of the signature is incremented by one. Otherwise a new session signature will be created, with reference count set to one, and added to the set of session signatures maintained by the collector.

By using the database of signatures, the amount of information to be compared every time a new session record is received by the collector is now significantly reduced from the total number session records to just all the session signatures. In an enterprise environment where sessions are generated mostly by either employee or business applications, which tend to repeat with patterns, the saving can be in several orders of magnitude, which not only increases the accuracy, the speed of detection, but can also cover much longer period of time.

Comparison of Session Signatures

A new session signature can be compared to existing signatures stored in the connection and application execution monitoring database as follows. The closest neighbor signature(s) are determined to be those existing signatures that most resemble to the new ones with the least differences in the signature attributes. The distance metrics between two signatures can depend on any number of factors, including, but not limited to, the priority or weight of each attribute and the number of attributes that are distinct between the two signatures. This information will help as a filter in reducing the set of signatures a security analyst may manually review for comparison. Also considered are the distinct attributes between the new signature and each of the "closest neighbors". The following example illustrates a comparison result given a new signature and the existing signature set.

New signature: {A: a2, B: b4, C: c3}
Signature set: [{A: a1, B: b1, C: c1},
{A: a1, B: b2, C: c2},
{A: a2, B: b1, C: c2},
{A: a2, B: b1, C: c3},
{A: a2, B: b3, C: c4},
{A: a3, B: b2, C: c5},
{A: a3, B: b3, C: c6}]
Comparison result: [{A: a2, B: b1 ***, C: c3}]

As can be seen above, the resulting match is an existing signature that differs in the B attribute. Comparison results can be any number of signature matches depending on the data involved and the threshold for how many differing attributes to filter on. For example, if the criteria were to require two or less differing attributes, the result set here would be bigger.

Session Chains

In an enterprise environment, privileged users, such as IT administrators and engineers typically utilize shared accounts, such as administrator/admin, root, service, or dev. Several types of accounts have elevated access or the highest privilege for managing systems. When administrators login to systems with these credentials and perform tasks, the system logs typically record, if present, activities performed by a "root" or "admin" account but will not include the true user identity. The problem is compounded when the administrator continues to log on to another server from the current server.

In several embodiments of the invention, a session chain tracks the activity of a particular user identity, network identity, and/or system identity within a system or as it hops from one server to another (e.g., by remote login or other remote access), by linking session signatures corresponding to each login session. For instance, the following is an example of signature chain that consists of two session signatures, where the first one is a user-application signature and the second is an application-application signature concatenated together.

[{chihwei@chihwei-MBP→cchao, sshd@x150}, {ssh@x150→dev, sshd@x149}]

This session signature chain shows that the first session signature is a user with corporate identify "chihwei" from device "chihwei-MBP" establishing a session utilizing SSH daemon on server "x150" with logon credential "cchao". The second session signature shows the SSH client application on server x150 is executed to logon to SSH daemon on server "x149" using credential "dev". Similar to the comparison of session signatures discussed above, session signature chains can be stored in the connection and application execution monitoring database (e.g., during a learning phase or mode) and new session signature chains can be compared to the stored chains (e.g., during a detection phase or mode). An anomaly can be identified as a new pattern of a signature chain that deviates from existing stored chains.

In many embodiments, session chains are stored in the connection and application execution monitoring database for use in audit, compliance, and/or forensic analysis.

Application Execution Tracing

Once landed on a server, malware can explore the vulnerability of any of the running applications or system commands to hijack the running process, instead of downloading foreign files to avoid detection. Once malware gains control of a running application, it can spawn a child process to run injected code or other system commands. Known exploit approaches include buffer overflow, malformed input data, as well as counterfeited dynamic link libraries. However there could be other unknown zero-day attacks aimed at applications with unknown vulnerable software bugs.

To detect this type of advanced attack, signature tracking and detection in accordance with several embodiments of the invention is applied to the application domain, where Application Execution Signatures (AES) are learned to detect any change in the run time behavior of a monitored application. As will be discussed below, different types of application execution signatures in accordance with embodiments of the invention can include process spawning signatures, file access signatures, and/or call graphs. In addition, network access patterns can be detected by including identifiers for associated session signatures and/or session chain signatures as attributes in the signature, which can serve to differentiate a file being accessed by two different network users, or by two different network client devices, or different network path to the server where the file is stored. Likewise for the process spawning events, new signatures can be detected and generated when the network access parts are different, even when the process image, command line, and/or process owner ID are all the same.

Process Spawning Signature

A process spawning signature represents a process hierarchy or process tree of instantiated processes (e.g., running applications, command shells, etc.) that are executing on a computing system (e.g., a server). Process spawning signatures can capture attributes that include, but are not limited to:

server name
application or command name
executable image path name
interpreter script name
system user ID
command line
current working directory
process start time
session signature ID (if applicable)
session signature chain ID (if applicable)
parent application/command
distribution over time (e.g., a configurable period or range such as time of day, days, weeks months, or repeat period such as day of the week)

For an executable that is an interpreter type of running engine, such as Linux shell, Java, Python, the actual codes is in the script file can be identified by the 'interpreter script name'. Session signature ID and session signature chain ID in a process spawning signature can provide the ability to differentiate the cases between a process created through a network session from one source entity, an end user or an initiating application on one server, versus a different source entity. The 'parent application/command' attribute in the process signature uniquely identify the parent process that spawn each and every new child process. If the context where an application or command is typically invoked changes from the ones in the process signature set, it may indicate an unexpected execution and warrant investigation.

File Access Signature

A file access signature represents a history of accessing one or more files by a particular user. File access signatures can include attributes such as, but not limited to:

server name
file path name
system user ID
application name
file access mode
session signature ID (if applicable)
session signature chain ID (if applicable)

distribution over time (e.g., a configurable period or range such as time of day, days, weeks months, or repeat period such as day of the week)

The session signature ID and session signature chain ID in the file access signature provide the ability to differentiate the events of accessing the same file, but coming from different network sources. A file access signature that includes connection lineage information such as session signature ID and/or session signature chain ID can be referred to as a data lineage signature. Identification of particular files or directories that are accessed can be utilized as context information.

Code Execution

A call graph is constructed by sampling a running application to collect its call stack at regular intervals over the learning period, combining all the possible stack traces of an application can be stored in the connection and application execution database as a comparison data set for later reference in detection. If during the learning period, the application is subject to sufficient input data and scenarios to reach a high percentage of code coverage, as done in a code coverage test, then the resulting training data set is a good base for comparing to future samples in detecting an anomaly. In several embodiments, further refinement of the call graph includes pruning, allowing for interrupts, and/or other optimization such as normalization discussed below. While resources on a system may limit capture to periodic sampling, continuous capture can be achieved given adequate resources and computing power (e.g., hardware acceleration). A call graph can be utilized as a signature for code execution.

While in detection mode, sensors installed in monitored servers continue capturing information about the running applications (at regular intervals or continuously), just like during the learning period, and forward the collected stack traces to the collector for comparison. If a count or percentage of mismatched samples increase beyond a threshold, computed over some time period or across an ensemble of many servers, then alert or other notice can be generated for further triaging and analysis.

Once a mismatched stack trace is analyzed to be a legitimate call sequence of the software, this new sample can be added to existing set of unique stack traces, so that future encounter of the same stack trace will not be considered as mis-matched. This procedure can be used in cases where part of the application software is being upgraded, such as loading a new version of dynamic linked library, for the training set to migrate as well without re-learning the application from scratch.

As dynamically loadable modules, such as dynamic linked libraries (e.g., library files with .so file extension), may be loaded in different virtual addresses in different process spaces, the stack trace learned from one process instance may not be the same as those in a different instances of the same application, or those process instances in different servers of the same operating system. To deal with this challenge, addresses in a stack trace corresponding to functions in a dynamic linked library can be normalized first before it is compared to the baseline. This can be done by subtracting the virtual address of a function call from the base address of the library to derive the offset information, and store this offset as part of the stack trace in training data set. When a new stack trace sample is received for comparison, the same conversion can be done before comparing to the training data set.

Software developed in high level languages, such as Java, Python, and even Linux shell, are not directly built into a binary executable image such as those written in C. In these situations utilizing an interpreter application engine, the running process that was sampled is actually the runtime interpreter engine of these languages, such as Java virtual machine, or Python runtime engine, and not the script files containing the actual applications. The captured information can include not only the raw command (script), but also the individual commands contained within the script.

To track these types of applications, a sensor in accordance with many embodiments of the invention performs additional sampling of the actual language specific script files, in addition to the interpreter engine itself. Tracking of the language specific scripts is typically dependent on the language architecture and design.

Processes for connection and application execution monitoring are discussed below.

Sensor Compromise Protection

Sensor compromise protection can be provided so that malware or users cannot compromise or disable the connectivity and application execution sensor itself. Typically, for a sensor to be compromised, at least some of the following factors are present: 1) an unauthorized user has logged in, 2) with privileges, 3) the user creates or installs an unauthorized process or file, and 4) the unauthorized process or file is executed. In many embodiments, any or all of these factors can be monitored by a connection and application execution monitoring application to detect such a threat. In addition, additional pieces of information from different sources can be correlated, such as, but not limited to: a) the process has file and socket info, b) command lines and executables, c) the network sensor has connection information, and d) multiple sensors as part of the distributed system. In this way, systems in accordance with various embodiments of the invention can be very robust to attempts by malware to deactivate connectivity and application execution sensors to avoid detection.

Every connection has a transmitting and receiving end. In many cases, both ends have connectivity and application execution sensors and there are additional connectivity and application execution sensors on the network as well. By comparing the output of these connectivity and application execution sensors, the system can detect if one or more connectivity and application execution sensors has been disabled by a user or malware. Sensor compromise protection can also be in hardware where connections on the wire are compared against the connectivity and application execution sensor provided data.

Processes for Connectivity and Application Execution Monitoring

Figure 4:
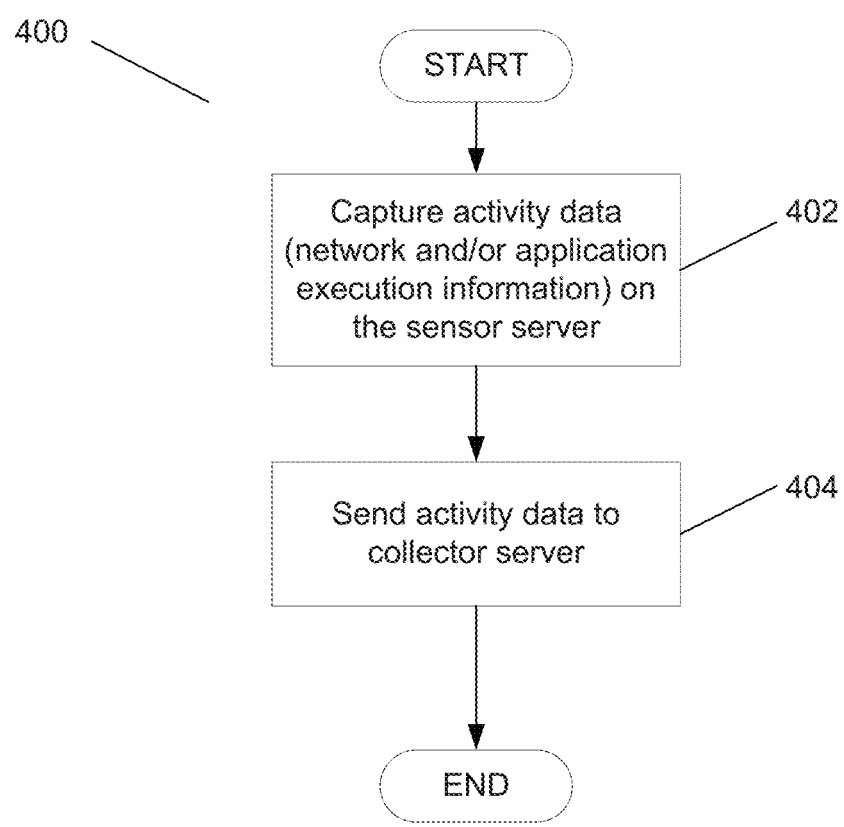
FIG. 4 is a flow chart illustrating a process for collecting activity data using a connectivity and application execution sensor in accordance with embodiments of the invention.

As discussed above, a server or other network appliance may perform a process for connectivity and/or application execution monitoring by collecting information about network connections and/or applications running on the device. A process for connectivity monitoring in accordance with embodiments of the invention is illustrated in FIG. 4. The process 400 includes capturing (402) activity data using a connection and application execution monitoring sensor on a server. In several embodiments, collecting activity data includes extracting connection/envelope information from network connections on the server and/or collecting information from running processes to obtain application execution information. Embodiments of the invention may utilize various tools and techniques by a sensor to collect the activity data as appropriate to different operating system environments (e.g., Linux, Windows, Mac). For example, different commands and tools that may be utilized include, but are not limited to, Netstat (network statistics), lsof (list open files), auditd (audit daemon), sysmon (system monitor), and/or perf (performance counters, call stack). One skilled in the art will appreciate that other tools for data collection may be utilized in accordance with embodiments of the invention as appropriate to a particular application. In addition, certain commands or tools may not provide a complete set of information on its own, but may be modified and/or supplemented by other commands or tools. For example, one tool may provide the start time of a network connection but not the end time, while another tool provides the connection end time. Merging the two sets of data can provide the total uptime of the connection. In several embodiments, data collection is sampled at discrete times and/or captured continuously.

In additional embodiments of the invention, a distributed detection and response system includes multiple collectors, each with an associated set of sensors. A session may be observed where the end point sensors are associated with different collectors. The collectors are configured to exchange information so that each collector has a complete set of signature information.

The collected activity data, which can include network and/or application information, also referred to as session records and application execution records, can be sent (404) to the collector server periodically. Although a specific process for monitoring connections and application execution is described above, one skilled in the art will recognize that any of a variety of processes may be utilized in accordance with embodiments of the invention. Collector servers and collector applications in accordance with embodiments of the invention are described below.

Processes for Collecting Connection and Application Execution Information and Determining Baseline Signatures The collector application gathers the connectivity records from all connectivity and application execution sensors and normalizes them with the context information and stores the records in the connection and application execution monitoring database. In many embodiments, one or more sensors send information to the collector application(s) executing on one or more collector server systems at regular intervals.

Figure 5A:
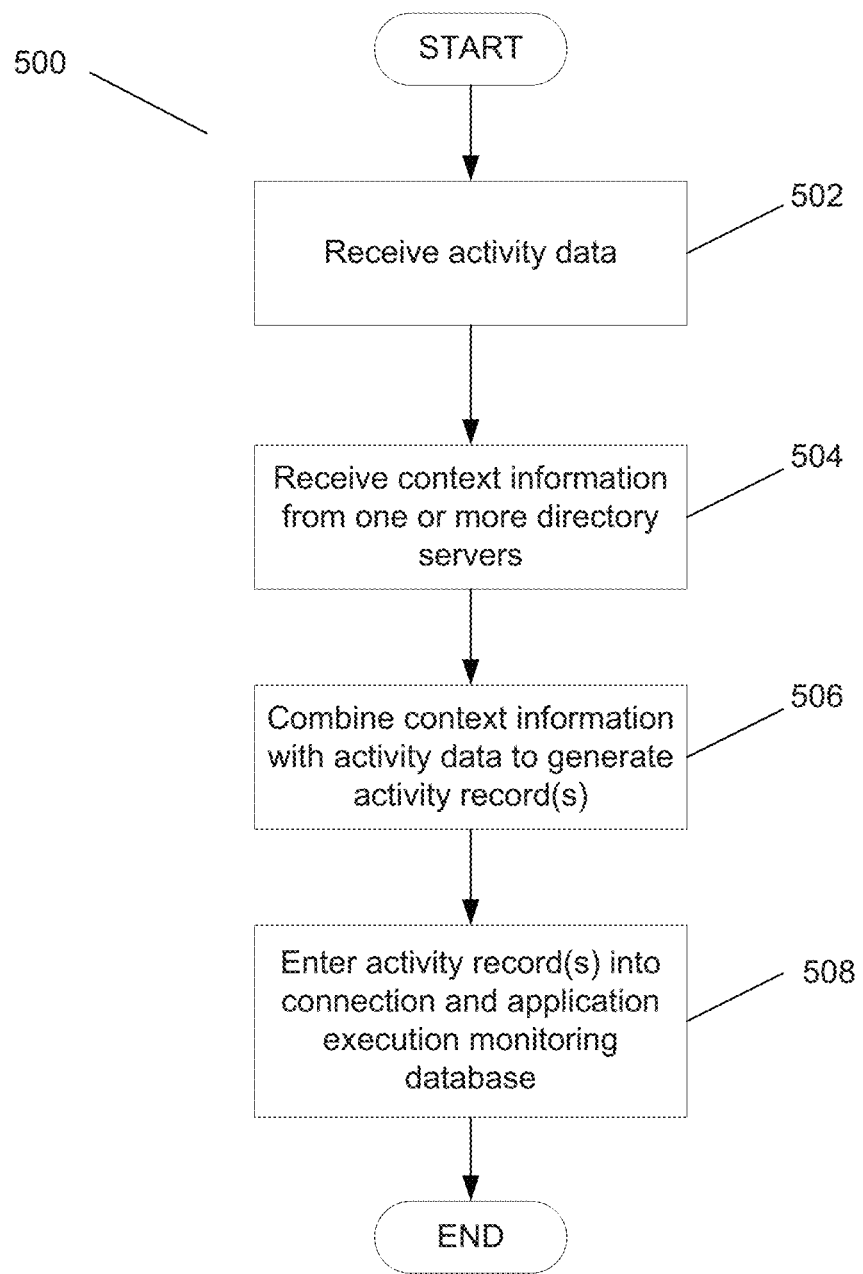
FIG. 5A is a flow chart illustrating a process for receiving and fusing activity data with context information in accordance with embodiments of the invention.

A process for receiving and processing connection and/or application execution information in accordance with embodiments of the invention is illustrated in FIG. 5A. The process 500 includes receiving (502) one or more pieces of activity data (e.g., connection information and/or application execution information) from one or more connectivity and application execution sensors.

The process receives (504) context information from one or more directory servers. As discussed further above, context information can include identity information about the entity involved with the activity data and/or information about files accessed. The process combines (506) context information with the received activity data to generate an activity record. In many embodiments, this provides that the actual end points (e.g., user, user account, device) are known for connections.

When the security application is in a learning period or mode, a set of baseline signatures (connection lineage signatures and/or application execution signatures) is built from incoming activity records (e.g., session records and/or application execution records). In many embodiments, the set of baseline signatures is built by counting (e.g., keeping a running count) of incoming records that match in a number of attributes. The activity record(s) are entered (508) into the connection and application execution monitoring database. Each activity record includes a number of attributes, such as those described further above. In many embodiments, an activity record includes a common part and a unique part. The common part includes attributes that are also part of baseline signatures. The unique part includes attributes that are not part of baseline signatures (such as time and date stamp of a communication or application event). In several embodiments, the common part does not need to be stored. Rather a pointer, reference, or identifier can be used to refer to an existing signature in the database that has the same values for those attributes within the common part. In this way, only the unique part of an activity record will be stored, achieving efficiency in using less storage space for stored activity records.

Several embodiments utilize a reference count to determine the significance of a particular signature. If the session signature attributes of a new incoming activity record matches any existing signature, then the reference count of the signature is incremented by one. Otherwise a new signature will be created, with reference count set to one, and added to the set of signatures maintained by the collector. When the count of a particular signature reaches a threshold number, the set of attributes is then saved as a baseline signature. Other criteria for becoming a baseline signature may be utilized in accordance with embodiments of the invention, such as considering other information indicative of whether a connection or application activity is legitimate, receiving user input whether the activity record is legitimate or suspicious, the count of the signature associated with a particular entity in comparison to similar signatures associated with other entities in a group to which that entity belongs, and/or utilizing a security policy specified for particular attributes.

In many embodiments, once the signature set is converging, i.e., the rate of new signature is below certain threshold, the collector will then transition from "learning" mode into "detection" mode. Any new signature generated during detection mode can be analyzed and triaged to determine if it is benign or suspicious and followed by more stringent inspection if necessary.

During the learning period, new signatures should be carefully reviewed to identify if they are indeed normal traffic. Particular attention is given to those signatures with low reference count. In several embodiments, a threat can be detected even in the learning mode in a variety of ways, including, but not limited to, having a low reference count, whether the signature is unique to a user or application and is rare (e.g., rare within a department or group), and/or whether the signature violates a preconfigured policy or is on a blacklist of signatures.

While a specific process for receiving and processing signature information is discussed above with respect to FIG. 5A, one skilled in the art will recognize that any of a variety of processes may be utilized in accordance with embodiments of the invention. Processes for detecting anomalies in accordance with embodiments of the invention are discussed below.

Processes for Detecting Anomalies using Baseline Signatures

Figure 5B:
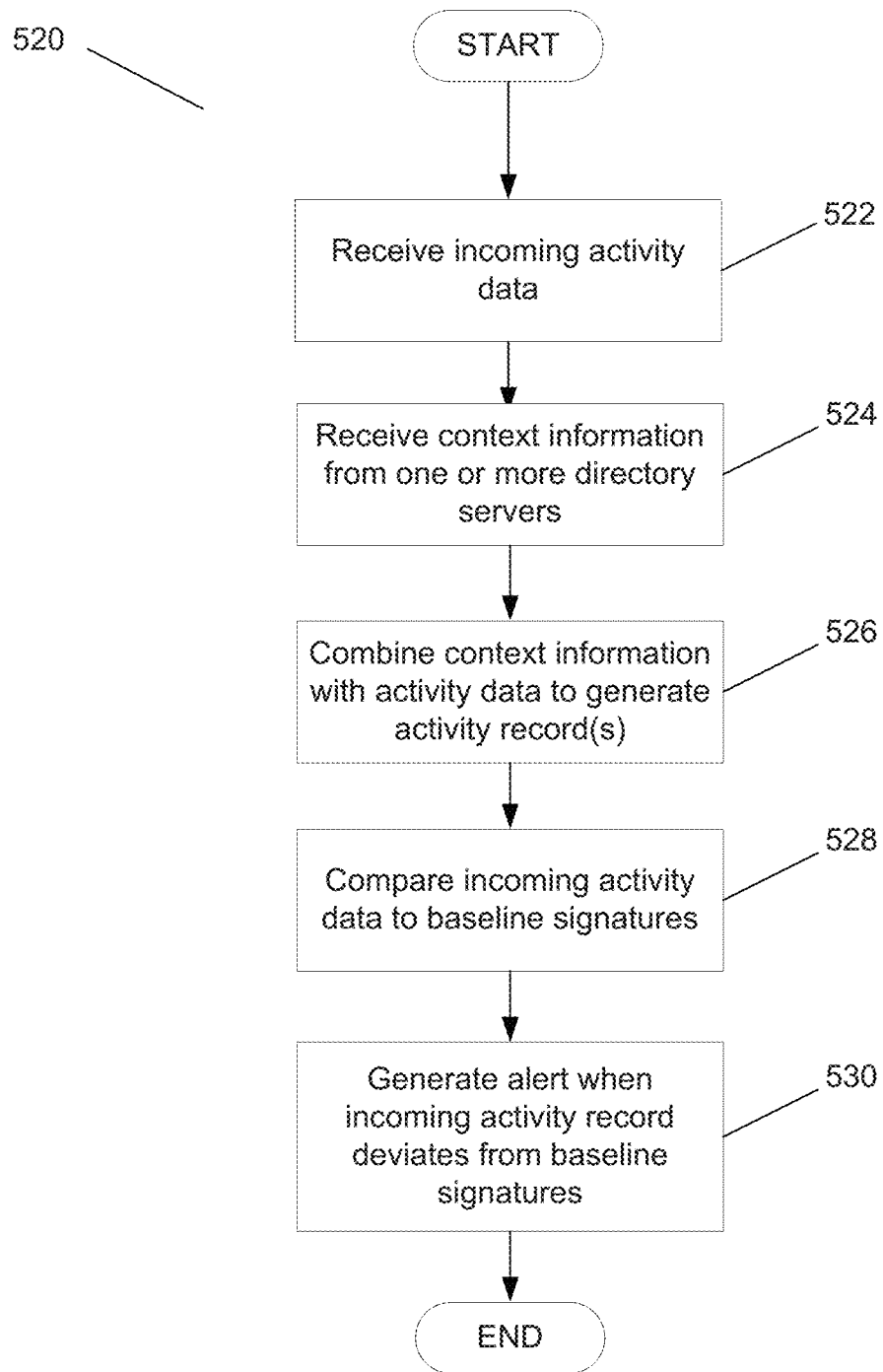
FIG. 5B is a flow chart illustrating a processing for detecting anomalies using baseline signatures in accordance with embodiments of the invention.

When the security application is in a detection period or mode, incoming records are compared against a set of baseline signatures stored in the signature database. A process for detecting an anomaly condition using baseline signatures in accordance with embodiments of the invention is illustrated in FIG. 5B. The process 520 includes receiving (522) a new incoming piece of activity data from one or more connectivity and application execution sensors. Where multiple collectors are involved in generating activity data, the information may come from one or more collectors.

Context information is received (524) and combined (526) with the activity data to form an activity record (e.g., session record and/or application execution record).

The incoming activity record(s) are compared (528) against the set of baseline signatures. An exact or close match (e.g., by a distance measure or difference in number of attributes as discussed further above) to one or more baseline signatures can be considered a normal or acceptable behavior. Larger deviations from matching the baseline signatures can indicate an anomalous condition. Certain attributes may utilize a range (e.g., time period within a day, week, month, etc.) or an interval of repeating (e.g., day of the week, month, etc.). A match can similarly be made in such cases, e.g., if the time is within the time period or if the date falls on that day of the week. In several embodiments of the invention, an alert is generated (530) if an incoming record in detection mode does not match any baseline signature by more than a predetermined number of attributes and/or differs from all baseline signatures by more than a predetermined number of attributes.

While a specific process for receiving signature information and detecting an anomaly condition is discussed above with respect to FIG. 5B, one skilled in the art will recognize that any of a variety of processes may be utilized in accordance with embodiments of the invention. Specific techniques for detecting anomalies in accordance with embodiments of the invention are discussed in greater detail below.

Threat Detection

Advanced security threats are typically characterized by initial exploratory behavior. During exploration, an advanced security threat attempts to discover the characteristics of the system that has been infiltrated and detect potential vulnerabilities that can be exploited to spread within the system. As discussed above, threat detection and prevent systems in accordance with various embodiments of the invention can detect a security threat using connection information and initiate any of a variety of enforcement actions in response. Abnormal connections that are indicative of exploratory behavior can be determined in one of several ways. Exploratory behavior of a threat can be detected from network activity including (but not limited to) pings, scans of resources, applications and databases, and/or dropped or terminated connections. Specific patterns of network behavior can be analyzed in a variety of ways to evaluate the likelihood that the activity is indicative of exploratory behavior associated with an advanced security threat. Connectivity models describe network connections indicative of the preference of bot-infected machines within a system. In several embodiments, connectivity models take into account the number of connections. In a number of embodiments, connectivity models can also consider such properties as the amount of data transferred via the connections, the ports and/or protocols that are used to transfer data, and/or entropy measurements of the packets of data transferred via the connections.

Furthermore, a threat can be detected from a policy violation where the policy is user-defined (facilitated by a progressive specification), derived from Data Center Management Applications (such as vSphere), IdM solutions or learned for certain features. Policies can be specified both with respect to an application and Enterprise users. Threats can be detected as a meaningful deviation from a baseline. Connectivity and traffic information (e.g., data volume) can be evaluated using temporal analysis to detect data gathering and exfiltration. Finally, exploration, policy violation, and/or baseline deviation may be detected as trap-induced, where a bait asset is provided and threat behavior is observed.

Additionally, the execution of malware in a variety of ways can be detected in AE-CLT filtering, including (but not limited to) a new process using a new end-point; process hallowing (e.g. a connection anomaly of an old process); DLL injection (e.g. a new end-point with CEM and connection anomaly), and code injection (e.g. a new end-point with CEM and connection anomaly).

Baselines may be maintained per user, group, and crowd and continuously adjusted (e.g., using a rolling average). A connection lineage signature together with networking information about the associated connection (e.g., envelope information) can represent a comprehensive profile for a network connection record seen in enterprise networks. A baseline for a pristine environment, without malware presence, can be built by collecting all the network connections running in the enterprise network during a learning period. Connection Lineage Signature (CLS) information can be used to refine (amplify or dampen) the estimation of abnormality in a network connection or detect abnormality even when the network connection appears completely normal. From the collection of CLS information of individual runs of a given application as a result of serving a network connection, a superset can be constructed that represents the overall reflection of runtime behavior of the application, taking into account all the input data and run time scenario. Generally, the more instances of run times that are observed, the more comprehensive the baseline can be.

After the learning period is over, a connection as a result of abnormal networking activity can often manifest itself through the connection information. If the networking activity appears to be normal but the application on the monitored entity handling this connection behaves abnormally (as seen from the codes set executed), the anomaly can still be detected through the evaluation of the Connection Lineage Signature (CLS). This aspect is particularly useful and critical if malware is able to compromise the employee credentials and follow their browsing history or infer application connectivity patterns to avoid triggering any anomaly at the network level.

In many embodiments of the invention, anomaly detection can be performed using vectors. The baseline CLS information and a set of runtime CLS information can be represented as two vectors in N dimensional space, and the distance between them computed with predetermined weights imposed on each of the vector elements. The measurement of distance from the baseline can be used to perform clustering analysis to identify an exceptional case as an anomaly. Enforcement actions that may be initiated by a threat detection and prevention system performing AE-CLT filtering are discussed below.

Enforcement

In several embodiments of the invention, each connectivity and application execution sensor may also include an enforcement application that uses a specified policy to provide micro-segmentation (e.g., as a firewall) to reduce the attack surface or to quarantine at a very fine grain level once a user, machine, or application has been determined to be compromised.

In a fine grain policy, a firewall may use a 7-tuple of items (source IP, source port, destination IP, destination port, virtual LAN, source MAC address, destination MAC address) as policy inputs for enforcement. Next generation firewalls may add user ID and application ID or name to the policy to perform additional enforcement using deep packet inspection. The policy can be extended with very fine grain details for both enforcement and anomaly detection by taking advantage of the additional information available from a connectivity and application execution sensor on each server. For example:

source executable name, which is the fully qualified path name of the executable file of the application.

application process ID, the process ID of one instance of an application which has multiple instances running at the same time.

DLL (Windows) name or kernel loaded module (Linux) name initiating or terminating socket calls.

the call graph sequence— when a socket call is made in the kernel, tracing back to the originating code that initiated the call.

user name, the user owning the running application instance.

Conclusion

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A process for detecting suspicious activity in a network and in a computer server system, comprising:
   receiving at a collector server, from a first connection and application execution sensor, a first piece of activity data from an observed system, the first piece of activity data comprising a first set of attributes, each attribute having a particular value;
   combining, using the collector server, a first set of context information with the first piece of activity data to generate a first activity record, wherein the first piece of activity data includes attributes describing an aspect of an application executing on the observed system;
   comparing, using the collector server, the first activity record to a set of baseline signatures, where each baseline signature comprises a second set of attributes, each attribute having a particular value and each baseline signature being unique in the combination of values of its attributes, where the second set of attributes includes an application name and a server name;
   incrementing, using the collector server, a count of a first matching baseline signature from the set of baseline signatures when the first activity record has the same values for all attributes in the first matching baseline signature;
   receiving at a collector server, from a second connection and application execution sensor, a second piece of activity data comprising a third set of attributes, each attribute having a particular value;
   combining, using the collector server, a second set of context information with the second piece of activity data to generate a second activity record; and
   generating, using the collector server, an alert when the values of the attributes of the second activity record differ from all baseline signatures in the set of baseline signatures by at least a predetermined threshold number of attributes and reconfiguring a policy on the second connection and application execution sensor that controls traffic in response to the generated alert.

2. The process of claim 1, further comprising storing the first activity record in a connection and application execution database as a record that includes:
   a reference to the first matching baseline signature; and
   values of attributes other than common attributes present in both the first activity record and the first matching baseline signature.

3. The process of claim 1, wherein associating, using the collector server, a first set of context information with the first piece of activity data comprises:
   looking up an IP address within the first piece activity data with an identity manager service to identify an associated entity.

4. The process of claim 1, wherein the connection information includes the attributes of: user name initiating the communication, identification of the user device, responding application name, responding server name, login ID to responding server, tunnel endpoint IP, and VPN gateway server.

5. The process of claim 1, wherein the first piece of activity data includes application execution information concerning an executing application on a device.

6. The process of claim 5, wherein the application execution information includes the attributes of: server name, application name, executable image path name, interpreter script name, system user ID, command line, current working directory, and process start time.

7. The process of claim 6, wherein the application execution information further includes the attributes of: session signature ID, session signature chain ID, and parent application.

8. The process of claim 5, wherein the application execution information includes the attributes of: server name, file path name, system user ID, application name, and file access mode.

9. The process of claim 8, wherein the application execution information further includes the attributes of: session signature ID and session signature chain ID.

10. The process of claim 5, wherein the application execution information includes a stack trace of an executing application.

11. The process of claim 1, wherein the first connection and application execution sensor is dynamically configurable.

12. The process of claim 1, further comprising highlighting within a user interface for review a reduced set of baseline signatures having a count below a predetermined threshold.

13. The process of claim 1, further comprising highlighting within a user interface for review a reduced set of baseline signatures unique to an entity within a group of entities to which the entity belongs.

14. The process of claim 1, further comprising highlighting within a user interface for review a reduced set of baseline signatures based upon a security policy.

15. The process of claim 1, further comprising monitoring user logins, privileges used by logged in users, process and file creations, and process and file executions on the first connection and application execution sensor to detect a compromise of the sensor.

16. The process of claim 1, wherein the first connection and application execution sensor is implemented using a hardware co-processor on a device.

17. The process of claim 1, further comprising searching for and retrieving the first activity record in response to a user instruction.

18. The process of claim 1, wherein the alert comprises one or more closest matching baseline signatures to the second activity record.

19. A collector server for detecting suspicious activity in a network and a computer server system, comprising:

a processor;
a network interface; and
memory comprising a collector application;
wherein the processor is directed by the collector application to:
receive, from a first connection and application execution sensor, a first piece of activity data from an observed system, the first piece of activity data comprising a first set of attributes, each attribute having a particular value, wherein the first piece of activity data includes attributes describing an aspect of an application executing on the observed system;
combine a first set of context information with the first piece of activity data to generate a first activity record;
compare the first activity record to a set of baseline signatures, where each baseline signature comprises a second set of attributes, each attribute having a particular value and each baseline signature being unique in the combination of values of its attributes, where the second set of attributes includes an application name and a server name;
increment a count of a first matching baseline signature from the set of baseline signatures when the first activity record has the same values for all attributes in the first matching baseline signature;
receive at the collector server, from a second connection and application execution sensor, a second piece of activity data comprising a third set of attributes, each attribute having a particular value;
combine a second set of context information with the second piece of activity data to generate a second activity record; and
generate an alert when the values of the attributes of the second activity record differ from all baseline signatures in the set of baseline signatures by at least a predetermined threshold number of attributes and reconfiguring a policy on the second connection and application execution sensor that controls traffic in response to the generated alert.

20. The collector server of claim 19, wherein the memory further comprises an identity management application and the identity management application directs the processor to receive the first set of context information and second set of context information.

21. The collector server of claim 19, wherein the memory further comprises an enforcement application and the enforcement application directs the processor to dynamically configure the first connection and application execution sensor in response to the generated alert.

22. The collector server of claim 19, wherein the collector application further directs the processor to store the first activity record in a connection and application execution database as a record that includes:
a reference to the first matching baseline signature; and
values of attributes other than common attributes present in both the first activity record and the first matching baseline signature.

23. The collector server of claim 19, wherein associating the first set of context information with the first piece of activity data comprises:
looking up an IP address within the first piece activity data with an identity manager service to identify an associated entity.

24. The collector server of claim 19, wherein the connection information includes the attributes of: user name initiating the communication, identification of the user device, responding application name, responding server name, login ID to responding server, tunnel endpoint IP, and VPN gateway server.

25. The collector server of claim 19, wherein the first piece of activity data includes application execution information concerning an executing application on a device.

26. The collector server of claim 25, wherein the application execution information includes the attributes of: server name, application name, executable image path name, interpreter script name, system user ID, command line, current working directory, and process start time.

27. The collector server of claim 26, wherein the application execution information further includes the attributes of: session signature ID, session signature chain ID, and parent application.

28. The collector server of claim 25, wherein the application execution information includes the attributes of: server name, file path name, system user ID, application name, and file access mode.

29. The collector server of claim 28, wherein the application execution information further includes the attributes of: session signature ID and session signature chain ID.

30. The collector server of claim 25, wherein the application execution information includes a stack trace of an executing application.

31. The collector server of claim 19, wherein the first connection and application execution sensor is dynamically configurable.

32. The collector server of claim 19, wherein the collector application further directs the processor to highlight within a user interface for review a reduced set of baseline signatures having a count below a predetermined threshold.

33. The collector server of claim 19, wherein the collector application further directs the processor to highlight within a user interface for review a reduced set of baseline signatures unique to an entity within a group of entities to which the entity belongs.

34. The collector server of claim 19, wherein the collector application further directs the processor to highlight within a user interface for review a reduced set of baseline signatures based upon a security policy.

35. The collector server of claim 19, wherein the collector application further directs the processor to monitor user logins, privileges used by logged in users, process and file creations, and process and file executions on the first connection and application execution sensor to detect a compromise of the sensor.

36. The collector server of claim 19, wherein the first connection and application execution sensor is implemented using a hardware co-processor on a device.

37. The collector server of claim 19, wherein the collector application further directs the processor to search for and retrieve the first activity record in response to a user instruction.

38. The collector server of claim 19, wherein the alert comprises one or more closest matching baseline signatures to the second activity record.

* * * * *